United States Patent
Gao et al.

(10) Patent No.: US 9,427,691 B2
(45) Date of Patent: Aug. 30, 2016

(54) ANTIMICROBIAL AIR FILTER

(71) Applicant: PTI Technologies, Inc., Oxnard, CA (US)

(72) Inventors: Michael L. Gao, Oxnard, CA (US); Kanwar Suri, Porter Ranch, CA (US)

(73) Assignee: PTI Technologies, Inc., Oxnard, CA (US)

( * ) Notice: Subject to any disclaimer, the term of this patent is extended or adjusted under 35 U.S.C. 154(b) by 0 days.

(21) Appl. No.: 14/657,375

(22) Filed: Mar. 13, 2015

(65) Prior Publication Data

US 2015/0258480 A1  Sep. 17, 2015

Related U.S. Application Data

(60) Provisional application No. 61/953,319, filed on Mar. 14, 2014.

(51) Int. Cl.
*B01D 46/00* (2006.01)
*B01D 46/10* (2006.01)
*B01D 46/52* (2006.01)

(52) U.S. Cl.
CPC .......... *B01D 46/0028* (2013.01); *B01D 46/10* (2013.01); *B01D 46/523* (2013.01)

(58) Field of Classification Search
CPC .......... B01D 39/1615; B01D 39/1623; B01D 46/10; B01D 46/28; B01D 46/523
USPC ............... 96/223, 226; 210/500.21, 501, 650
See application file for complete search history.

(56) References Cited

U.S. PATENT DOCUMENTS

| | | | |
|---|---|---|---|
| 6,846,777 B2 | 1/2005 | Antoni-Zimmermann et al. | |
| 8,362,051 B2* | 1/2013 | Tinetti | A01N 25/34 424/411 |
| 2004/0043686 A1* | 3/2004 | Batdorf | A01N 25/34 442/123 |
| 2006/0117958 A1* | 6/2006 | Sakadume et al. | 96/223 |
| 2008/0317802 A1* | 12/2008 | Lee | A01N 43/80 424/409 |
| 2011/0172173 A1* | 7/2011 | Kritikou | 514/28 |
| 2014/0188089 A1* | 7/2014 | Midgette et al. | 604/539 |

OTHER PUBLICATIONS

*Ultra-Fresh®* DM-50, Registered Trademark of Kroy International Inc., Manufactured for Thomson Research Associates, 7 pages. (1998).
*Ultra-Fresh\** 15 Antimicrobial Agent, Registered trademark of Thomson Associates, Manufactured for Thomson Research Associates, 4 pages (2000).
*Ultra-Fresh\** DM-50 Technical Data Sheet, Registered trademark of Thomson Associates, Manufactured for Thomson Research Associates, 5 pages (2005).

* cited by examiner

*Primary Examiner* — Robert Clemente
*Assistant Examiner* — Karla Hawkins
(74) *Attorney, Agent, or Firm* — Brinks Gilson & Lione; John C. Bacoch

(57) ABSTRACT

A microbial resistant air filter is disclosed. The microbial resistant air filter has air filter media having first and second antimicrobial agents. The first antimicrobial agent is diiodomethyl-p-tolyl sulfone and the second antimicrobial agent is a combination of zinc omadine and thiabendazole.

6 Claims, 1 Drawing Sheet

ANTIMICROBIAL AIR FILTER

BACKGROUND

1. Technical Field

Embodiments of the invention relate to air filtration and more particularly to air filter media having antimicrobial properties.

2. Background Information

Commercial aircraft cabins may contain hundreds of passengers crowded into a small space for an extended period of time. The air within the aircraft cabin may be polluted to various degrees by dust, pollens, lint, smoke, as well as infections agents such bacteria, fungi, and viruses. The passengers may contribute to these pollutants, and each passenger is at an increased risk of catching an infectious disease while in the aircraft cabin.

To reduce the amount of pollutants and the risk of infection disease, the cabin air is recirculated through high efficiency particulate absorption (HEPA) filters to reduce the amount of pollutants. Additionally, fresh air is provided from an external source to supplement the recirculated air. Commercial aircraft cabins and flight decks typically recirculate approximately 50% of the cabin air and add approximately 50% fresh air from the external source. The external source of air assures that the recirculated portion does not endlessly recirculate, but is diluted and replaced with outside air.

Over time, infectious agents such as fungus and bacteria may build up on the HEPA filter. The fungus and bacteria may even grow on the HEPA filter and consequently add to the amount of pollutants in the air. When a HEPA filter has begun to grow fungus and mold, it should be replaced with a fresh filter. It would be beneficial to have a HEPA filter design that was resistant to growing mold and fungus.

BRIEF SUMMARY

In one aspect, an air filtration media is disclosed including a porous media having a first antimicrobial agent which is diiodomethyl-p-tolyl sulfone in contact with the porous media, and a second antimicrobial agent which is a combination of zinc omadine and thiabendazole in contact with the porous media. In some embodiments, the zinc omadine and thiabendazole are present in equal proportions. In some embodiments the porous media comprises a mesh of fibers. In some embodiments, the first antimicrobial agent in contact with the porous media has a concentration of between 150 parts per million and 250 parts per million. In some embodiments, the second antimicrobial agent in contact with the porous media has a concentration between 350 parts per million and 450 parts per million.

In another aspect, a method of preparing a porous media for microbial resistance is disclosed that includes wetting the porous media with a first solution having a first antimicrobial agent which is diiodomethyl-p-tolyl sulfone, and wetting the porous mat of fibers with a second solution having a second antimicrobial agent which is a combination of zinc omadine and thiabendazole. In some embodiments, the porous media is saturated with the first solution and the second solution. In some embodiment, the air filter is then dried. In some embodiments, the first solution has a concentration of 1% of the first microbial agent and in some embodiments, the second solution has a concentration of 0.3% of the second microbial agent.

In another aspect, an antimicrobial air filter is disclosed that includes a frame and a porous media having a first antimicrobial agent which is diiodomethyl-p-tolyl sulfone in contact with the porous media, and a second antimicrobial agent which is a combination of zinc omadine and thiabendazole in contact with the porous media. In some embodiments, the zinc omadine and thiabendazole are present in equal proportions. In some embodiments, the first antimicrobial agent in contact with the porous media has a concentration of between 150 parts per million and 250 parts per million and in some embodiments, the second antimicrobial agent in contact with the porous media has a concentration between 350 parts per million and 450 parts per million.

DETAILED DESCRIPTION

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Figure 1:
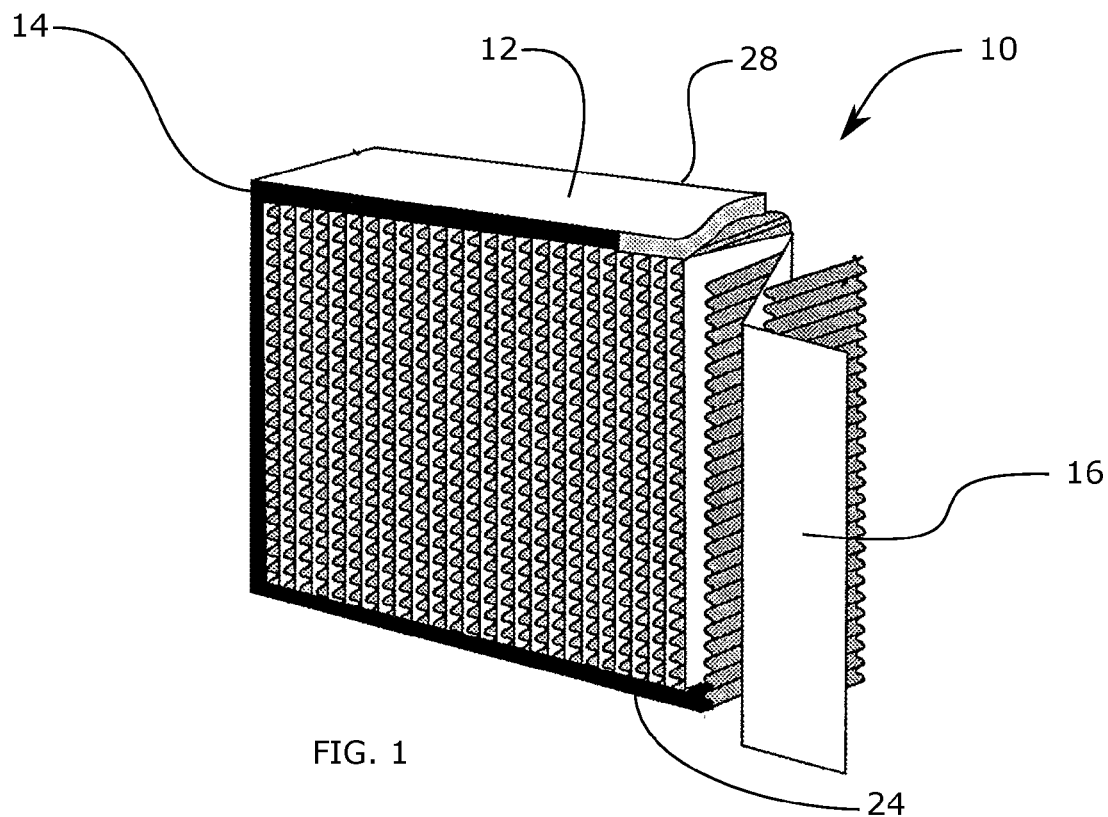
FIG. 1 illustrates a general schematic of an air filter for use with the current invention.

FIG. 1 illustrates a general schematic of an air filter 10. The air filter 10 has a frame 12 that provides structure to support the air filter 10. The frame 12 has a gasket 14 on at least one face that seals to another surface when the air filter 10 is placed into service. The frame 12 shown in FIG. 1 is rectangular in construction but need not be.

Figure 2:
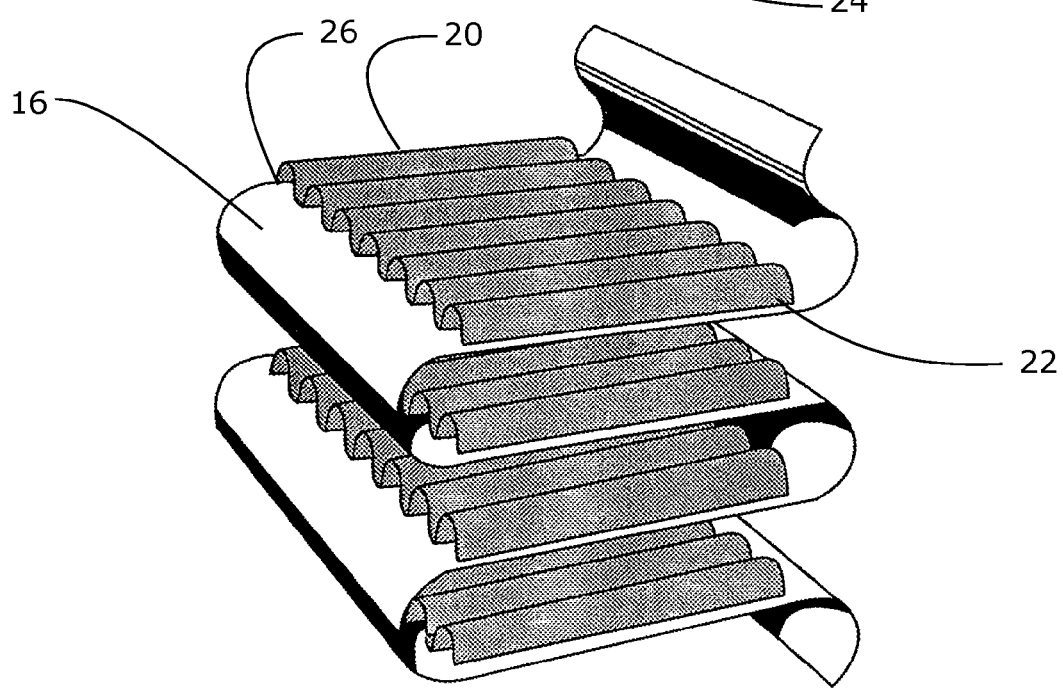
FIG. 2 illustrates a detailed schematic of the air filter media of the air filter of FIG. 1.

FIG. 2 illustrates a detailed schematic of air filter media 16 contained within the air filter 10. The air filter media 16 is a sheet of material that is pleated within the frame 12. The air filter media 16 is supported by separators 20 that separate adjoining pleats. A first end 22 of the separators 20 are attached to a first side 24 of the frame 12 and a second end 26 of the separators 20 are attached to a second side 28 of the frame. A grill or mesh may cover the open ends of the frame 12. The separators 20 may attach to the grill or mesh in addition to the frame 12.

The air filter media 16 comprises a porous media that permits the passage of gaseous fluids through pores while trapping particulates that may stick to the porous media. The porous media may comprise a mat of randomly arranged fibers, and the selection of media material that can be used includes any suitable material on which the antimicrobial compositions described hereafter can be applied. The porous media is treated with an anti-microbial solution containing anti-microbial agents in suspension. The filter media 16 is wetted with the antimicrobial solution and allowed to dry. In some embodiments, the filter media may be saturated with the antimicrobial solution. The anti-microbial agents that were suspended in the antimicrobial solution remain on the air filter media 16 after drying and inhibit the growth of infectious agents such as microbes.

There are various anti-microbial agents that are available for application to the air filter media 16. Preferably the anti-microbial agents would exhibit near 100% surface inhibition of growth of bacteria and fungus. To determine the effectiveness of an antimicrobial agent with regard to bacteria, samples of air filter media 16 were treated with various solutions of antimicrobial agents and subjected to a quantitative test.

In the quantitative test for bacterial growth, an air filter media sample was saturated with a solution of an antimicrobial agent and allowed to dry. The air filter media sample was then placed in a sealed container and a 0.2 mL inoculum of Staphylococcus aureus (ATCC #6538) was placed, in microdroplets, on the surface of the air filter media sample. A solution having a 0.05% concentration of polysorbate 80 was added to the inoculum as a wetting agent. The air filter media sample was then incubated for 18 hours at a temperature of 37 C°. After incubation, 20 mL of Letheen broth was added to the container, and the container was shaken. The bacteria in the resulting liquid were then quantified using a series of dilution plates.

The tests were performed using a 1% solution of a diiodomethyl-p-tolyl sulfone antimicrobial agent having a trade name of Ultra-Fresh 150®, a 2% solution of silver chloride antimicrobial agent having a trade name of SilPure FBR-5®, a combination of a 1% solution of the silver chloride antimicrobial agent and a 1% solution of the diiodomethyl-p-tolyl sulfone antimicrobial agent, a 0.3% solution of a combination zinc omadine and thiabendazole microbial agent having a trade name of Ultra-Fresh DW-56®, and a 1% solution of a combination 2-n-octyl-4-isothiazolin-3-one and S-chloro-2-(2,4-dichlorophenoxy) phenol microbial agent having a trade name of Ultra-Fresh FT-7®.

The results of the quantitative test for bacterial growth using these anti-microbial solutions are shown in table 1.

TABLE 1

| Sample Description | # of Bacteria Recovered | Log Recovery ($M_c$) | Log Reduction (S) | % Reduction |
|---|---|---|---|---|
| Untreated control | $1.26 \times 10^6$ | 6.1 | — | — |
| 1% diiodomethyl-p-tolyl sulfone | $<2.00 \times 10^1$ | <1.3 | >4.8 | >99.9% |
| 2% silver chloride | $1.81 \times 10^4$ | 4.3 | 1.8 | 98.6% |
| 1% diiodomethyl-p-tolyl sulfone + 1% silver chloride | $<2 \times 10^1$ | <1.3 | >4.8 | >99.9% |
| 0.3% Zinc Omadine and Thiabendazole | $<2 \times 10^1$ | <1.3 | >4.8 | >99.9% |
| 1% 2-n-Octyl-4-isothiazolin-3-one and S-chloro-2-(2,4-dichlorophenoxy)phenol | $2.26 \times 10^4$ | 4.4 | 1.7 | 98.2% |

Based on the results in table 1, it was found that the solutions of 1% diiodomethyl-p-tolyl sulfone, 1% silver chloride and 1% diiodomethyl-p-tolyl sulfone, and 0.3% zinc omadine and thiabendazole were most effective at inhibiting bacterial growth.

Air filter media samples treated with the aforementioned antimicrobial solutions were then tested for antifungal properties using the common American Association of Textile Chemists and Colorists (AATCC) Test Method 30-2013. The test results indicate a measurement of a growth-free zone and surface inhibition. A larger growth-free zone indicates higher antifungal properties, and a higher surface inhibition indicates higher antifungal properties. The test was performed for both Aspergillus niger and Trichoderma virens species of fungus. The results of this test are shown in Table 2.

TABLE 2

| Sample | Aspergillus niger fungus | | Trichoderma virens fungus | |
|---|---|---|---|---|
| | Growth-Free Zone in MM | Surface Inhibition | Growth-Free Zone in MM | Surface Inhibition |
| Untreated control (281236) | 0 | 0 | 0 | 0 |
| 1% diiodomethyl-p-tolyl sulfone | 0 | 0 | 0 | 50 |
| 1% silver chloride and + 1% diiodomethyl-p-tolyl sulfone | 0 | 90 | 0 | 90 |
| 0.3% zinc omadine and thiabendazole | 0 | 90 | 9 | 100 |

Based on the results shown in table 2, it was found that the solution of 0.3% zinc omadine and thiabendazole was most effective at inhibiting fungal growth.

The 0.3% solution of zinc omadine and thiabendazole was selected as being the most effective antibacterial application along with being the most effective anti-fungal application. To determine the effectiveness of the zinc omadine and thiabendazole solution and find an optimum concentration throughout the service life of the media sample, the previous tests were performed again using different concentrations of zinc omadine and thiabendazole. The results of the testing are shown in tables 3 and 4.

TABLE 3

| Sample Description | No. Bacteria Recovered | Log Recovery ($M_c$) | Log Reduction (S) | % Reduction |
|---|---|---|---|---|
| 0.5% zinc omadine and thiabendazole, 50% service life | $<2.00 \times 10^1$ | <1.3 | >3.2 | >99.9% |
| 0.5% zinc omadine and thiabendazole, 100% service life | $<2.00 \times 10^1$ | <1.3 | >3.2 | >99.9% |
| 0.7% zinc omadine and thiabendazole, 50% service life | $<2.00 \times 10^1$ | <1.3 | >3.2 | >99.9% |
| 0.7% zinc omadine and thiabendazole, 100% service life | $<2.00 \times 10^1$ | <1.3 | >3.2 | >99.9% |

TABLE 4

| Sample | Aspergillus niger fungus | | Trichoderma virens fungus | |
|---|---|---|---|---|
| | Growth-Free Zone in MM | Surface Inhibition | Growth-Free Zone in MM | Surface Inhibition |
| 0.5% zinc omadine and thiabendazole, 50% service life | 0 | 90 | 5 | 100 |
| 0.5% zinc omadine and thiabendazole, 100% service life | 0 | 90 | 6 | 100 |
| 0.7% zinc omadine and thiabendazole, 50% service life | 0 | 95 | 5 | 100 |
| 0.7% zinc omadine and thiabendazole, 100% service life | 0 | 95 | 7 | 100 |

As shown in tables 3 and 4, zinc omadine and thiabendazole were effective as an antibacterial agent and as an antifungal agent throughout the service life of the media. Increasing the concentration of the solution of zinc omadine and thiabendazole improved the properties as an antifungal agent but was not 100% effective at surface inhibition with regard to *Aspergillus niger*. No test was able to completely inhibit surface inhibition of *Aspergillus niger*. A 1% solution having diiodomethyl-p-tolyl sulfone performed poorly in the antifungal tests and did not inhibit any growth of *Aspergillus niger* and was limited in its effectiveness with regard to *Trichoderma virens*. Based on the results shown above, it would appear that zinc omadine and thiabendazole is the best choice for treating a filter for antimicrobial resistance.

Despite 1% diiodomethyl-p-tolyl sulfone being ineffective as an antifungal ingredient, it was combined with zinc omadine and thiabendazole and tested to determine the effectiveness of the combination. It would be expected that the diiodomethyl-p-tolyl sulfone would have no benefit to the zinc omadine and thiabendazole. The results of this test are shown in tables 5 and 6.

TABLE 5

| Sample Description | No. Bacteria Recovered | Log Recovery ($M_c$) | Log Reduction (S) | % Reduction |
|---|---|---|---|---|
| 1% diiodomethyl-p-tolyl sulfone and 0.3% zinc omadine, and thiabendazole | <2.00 × 10$^1$ | <1.3 | >4.1 | >99.9% |

TABLE 6

| | *Aspergillus niger* fungus | | *Trichoderma virens* fungus | |
|---|---|---|---|---|
| Sample | Growth-Free Zone in MM | Surface Inhibition | Growth-Free Zone in MM | Surface Inhibition |
| 1% diiodomethyl-p-tolyl sulfone and 0.3% zinc omadine, and thiabendazole | 1 | 100 | 6 | 100 |

Surprisingly, the addition of diiodomethyl-p-tolyl sulfone increased the effectiveness of the zinc omadine and thiabendazole, despite diiodomethyl-p-tolyl sulfone being ineffective as an antifungal on its own. Moreover, by adding 1% diiodomethyl-p-tolyl sulfone to 0.3% zinc omadine and thiabendazole, the effectiveness exceeds that of higher concentrations of zinc omadine and thiabendazole on their own.

The combination of solutions of diiodomethyl-p-tolyl sulfone, zinc omadine, and thiabendazole has been found to be the most effective treatment to limit the growth of bacteria and fungus on the filter substrate.

The air filter media sample was tested to determine the concentration of the antimicrobial agents using common techniques. It was found that optimum concentration of agents was 200 parts per million of diiodomethyl-p-tolyl sulfone and 400 parts per million of zinc omadine and thiabendazole.

In another aspect, a method of filtering gaseous fluids is disclosed. In the method, a filter, such as air filter 10, having a porous media, such as filter media 16, has a diiodomethyl-p-tolyl sulfone antimicrobial agent in contact with the filter and a zinc omadine and thiabendazole antimicrobial agent in contact with the filter is provided. A gaseous fluid, such as recirculated air, is then passed through the filter to remove particulates.

It should be understood that various changes and modifications to the presently preferred embodiments described herein will be apparent to those skilled in the art. For example, the air filter may have a different shape than that shown such as a cylinder with the air filter media on a curved side. In other embodiments, the air filter media may be arranged in a shape other than pleating.

We claim:

1. An air filtration media comprising:
    a porous media having a first antimicrobial agent which is diiodomethyl-p-tolyl sulfone in contact with the porous media and having a concentration between 150 parts per million and 250 parts per million, and a second antimicrobial agent which is a combination of zinc omadine and thiabendazole in contact with the porous media and having a concentration between 350 parts per million and 450 parts per million.

2. The air filtration media of claim 1, wherein porous media comprises a mesh of fibers.

3. A method of preparing a filter, the method comprising:
    contacting a porous media with a first solution comprising a first antimicrobial agent which is diiodomethyl-p-tolyl sulfone at a 1% concentration; and
    contacting the porous media with a second solution comprising a second antimicrobial agent which is a combination of zinc omadine and thiabendazole at a 0.3% concentration.

4. The method of claim 3, wherein the porous media is saturated with the first solution and the second solution.

5. The method of claim 3, further comprising drying the air filter.

6. An antimicrobial air filter comprising:
    a frame; and
    a porous filter media having a first antimicrobial agent which is diiodomethyl-p-tolyl sulfone in contact with the porous filter media and having a concentration between 150 parts per million and 250 parts per million, and a second antimicrobial agent which is a combination of zinc omadine and thiabendazole in contact with the porous filter media and having a concentration between 350 parts per million and 450 parts per million.

\* \* \* \* \*